358-84 SR

2/10/87 OR 4,642,685

United States Patent [19]

Roberts et al.

[11] Patent Number: 4,642,685

[45] Date of Patent: Feb. 10, 1987

[54] STORING DATA RELATING TO TELEVISION VIEWING

[75] Inventors: Lyn M. Roberts; Robert L. Shrier, both of London; Raymond Laxton, Maidenhead, all of England

[73] Assignee: AGB Research, London, England

[21] Appl. No.: 614,321

[22] Filed: May 24, 1984

[30] Foreign Application Priority Data

May 25, 1983 [GB] United Kingdom ................. 8314468

[51] Int. Cl.[4] ........................ H04N 17/04; H04H 9/00

[52] U.S. Cl. ............................................ 358/84; 455/2

[58] Field of Search ............................ 358/84; 455/2; 179/2 AM, 2 AS; 340/870.03

[56] References Cited

U.S. PATENT DOCUMENTS

| | | | |
|---|---|---|---|
| 3,483,327 | 12/1969 | Schwartz | 358/84 X |
| 3,662,366 | 5/1972 | Neuville et al. | 340/870.03 |
| 3,803,349 | 4/1974 | Watanabe | 358/84 |
| 3,849,729 | 11/1974 | Van Baggem | 455/2 |
| 4,092,524 | 5/1978 | Moreno | 235/419 |
| 4,216,497 | 8/1980 | Ishman et al. | 358/84 |
| 4,272,757 | 6/1981 | McLaughlin et al. | 340/825.35 |
| 4,338,601 | 7/1982 | Nance-Kivell | 340/870.03 X |
| 4,377,870 | 3/1983 | Anderson et al. | 358/84 X |
| 4,433,387 | 2/1984 | Dyer et al. | 364/900 |
| 4,546,382 | 10/1985 | McKenna et al. | 358/84 |
| 4,566,030 | 1/1986 | Nickerson et al. | 358/84 |
| 4,567,511 | 1/1986 | Smith et al. | 358/84 |

FOREIGN PATENT DOCUMENTS

| | | | |
|---|---|---|---|
| 128481 | 12/1984 | European Pat. Off. | 358/84 |
| 144085 | 6/1985 | European Pat. Off. | 358/84 |
| 1536414 | 12/1978 | United Kingdom | 455/2 |

*Primary Examiner*—Keith E. George
*Attorney, Agent, or Firm*—Wood, Dalton, Phillips Mason, & Rowe

[57] ABSTRACT

In an apparatus comprising a combination of transmission means and storage means, the transmission means comprises (a) means for accepting data from people monitoring means which produces information relating to the number of people watching a television set and/or television channel detection means of a television viewing monitoring system; and (b) means for transmitting such data to the storage means, the storage means comprising a semiconductor data module (110) which is removable from the apparatus.

9 Claims, 18 Drawing Figures

STORING DATA RELATING TO TELEVISION VIEWING

According to the present invention, there is provided apparatus comprising a combination of transmission means and storage means, the transmission means comprising:

(a) means for accepting data from people monitoring means which produces information relating to the number of people watching a television set and/or television channel detection means of a television viewing monitoring system; and (b) means for transmitting such data to the storage means, the storage means comprising a semiconductor data storage module which is removable from the apparatus.

For a better understanding of the present invention, and to show how the same may be carried into effect, reference will now be made, by way of example, to the accompanying drawings, in which.

Figure 2:
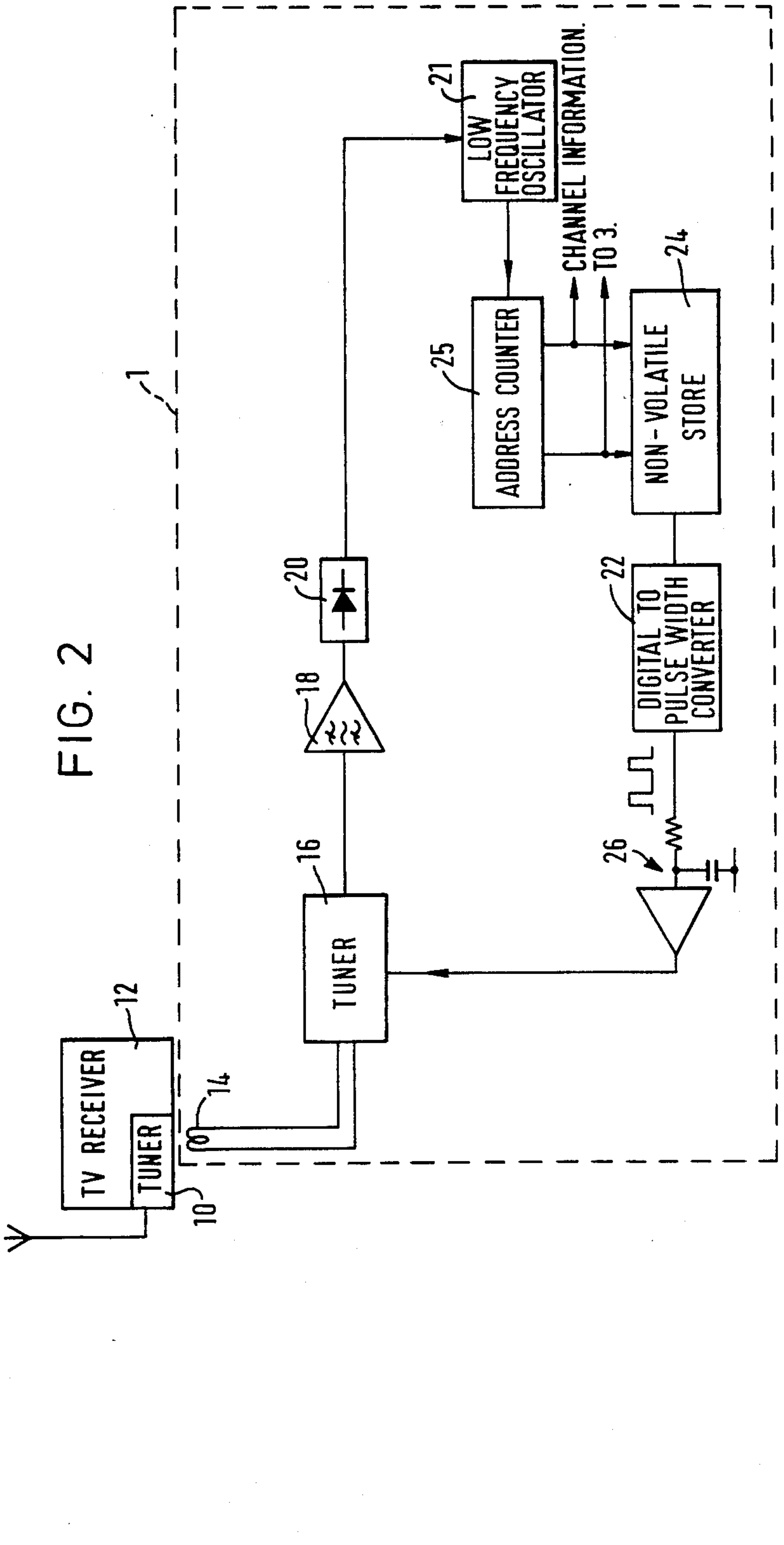
FIG. 2 is a block diagram of a television channel detection unit.
Figure 4A:
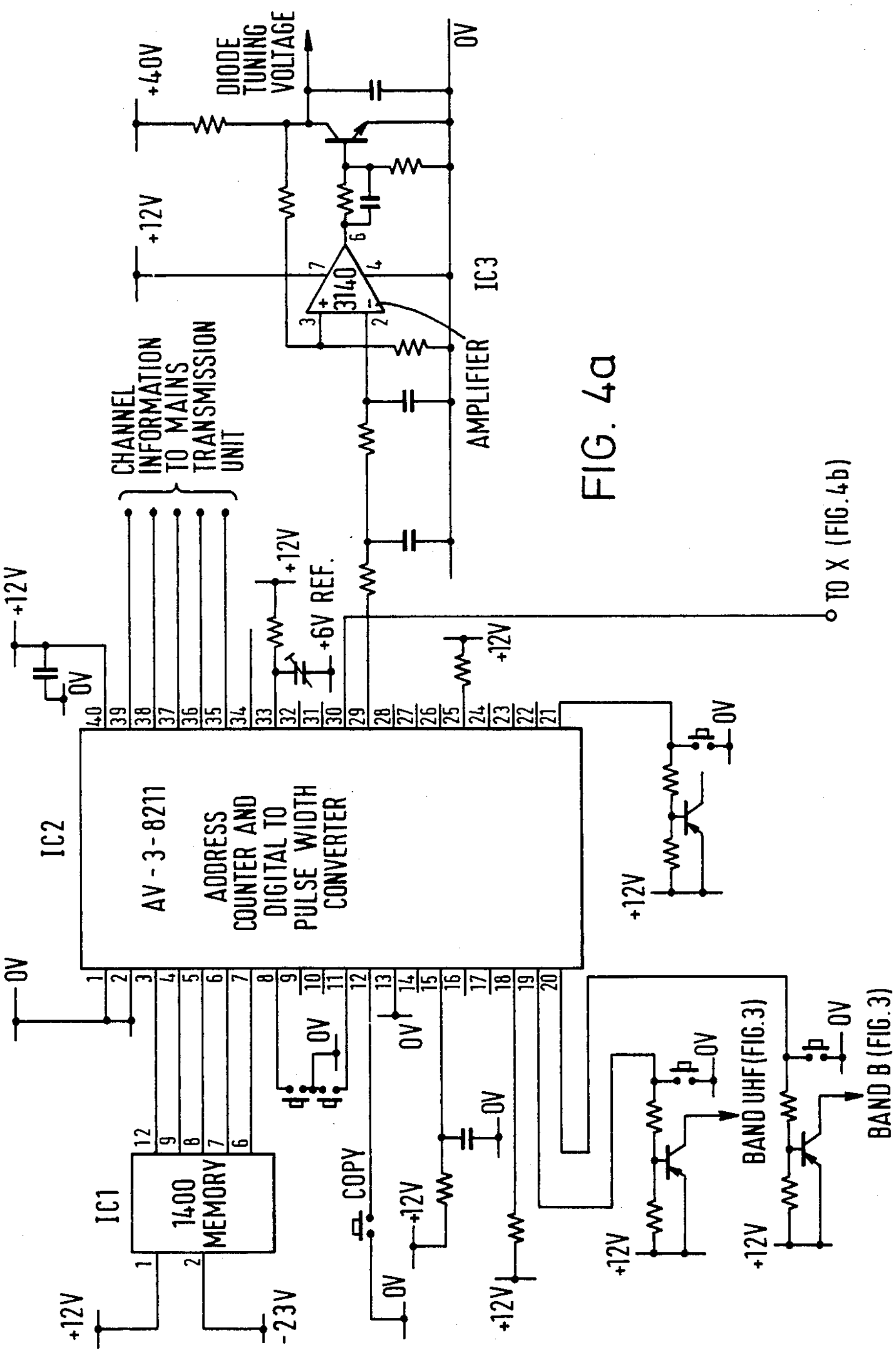
Figure 4B:
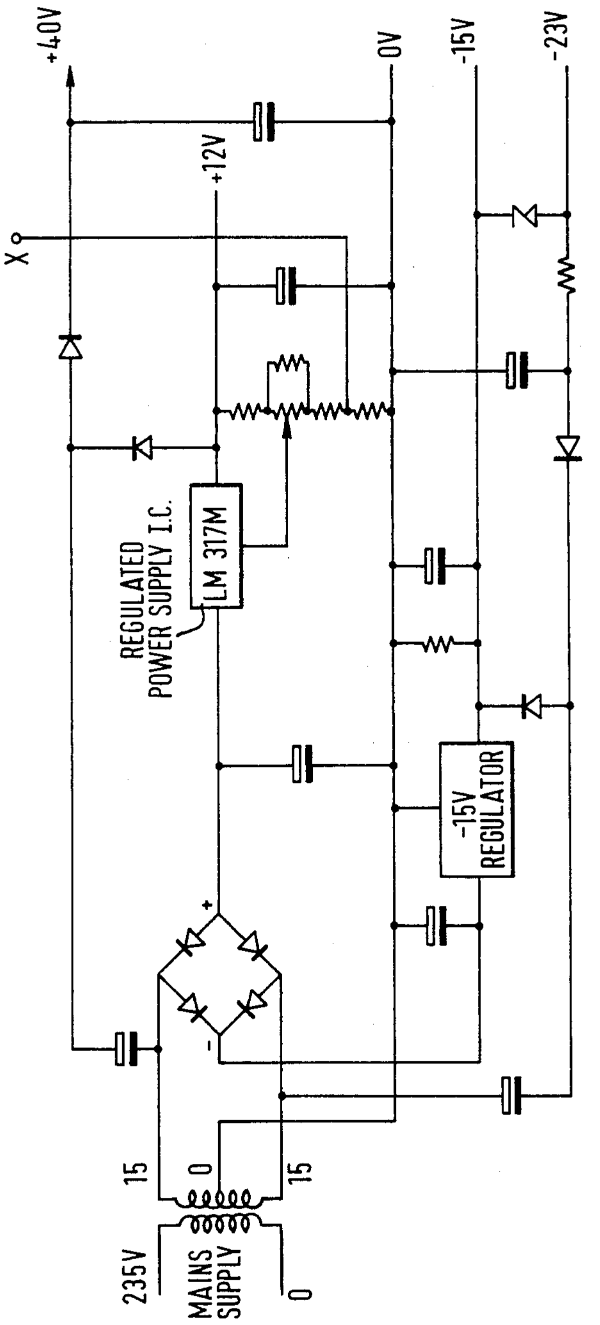
Figure 5:
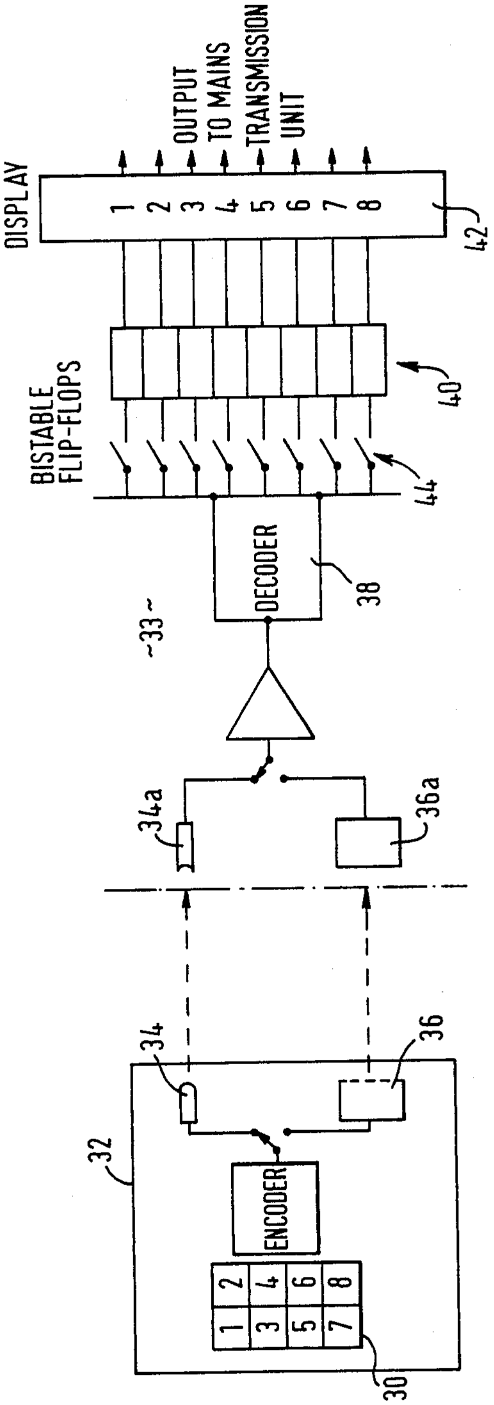
Figure 6A:
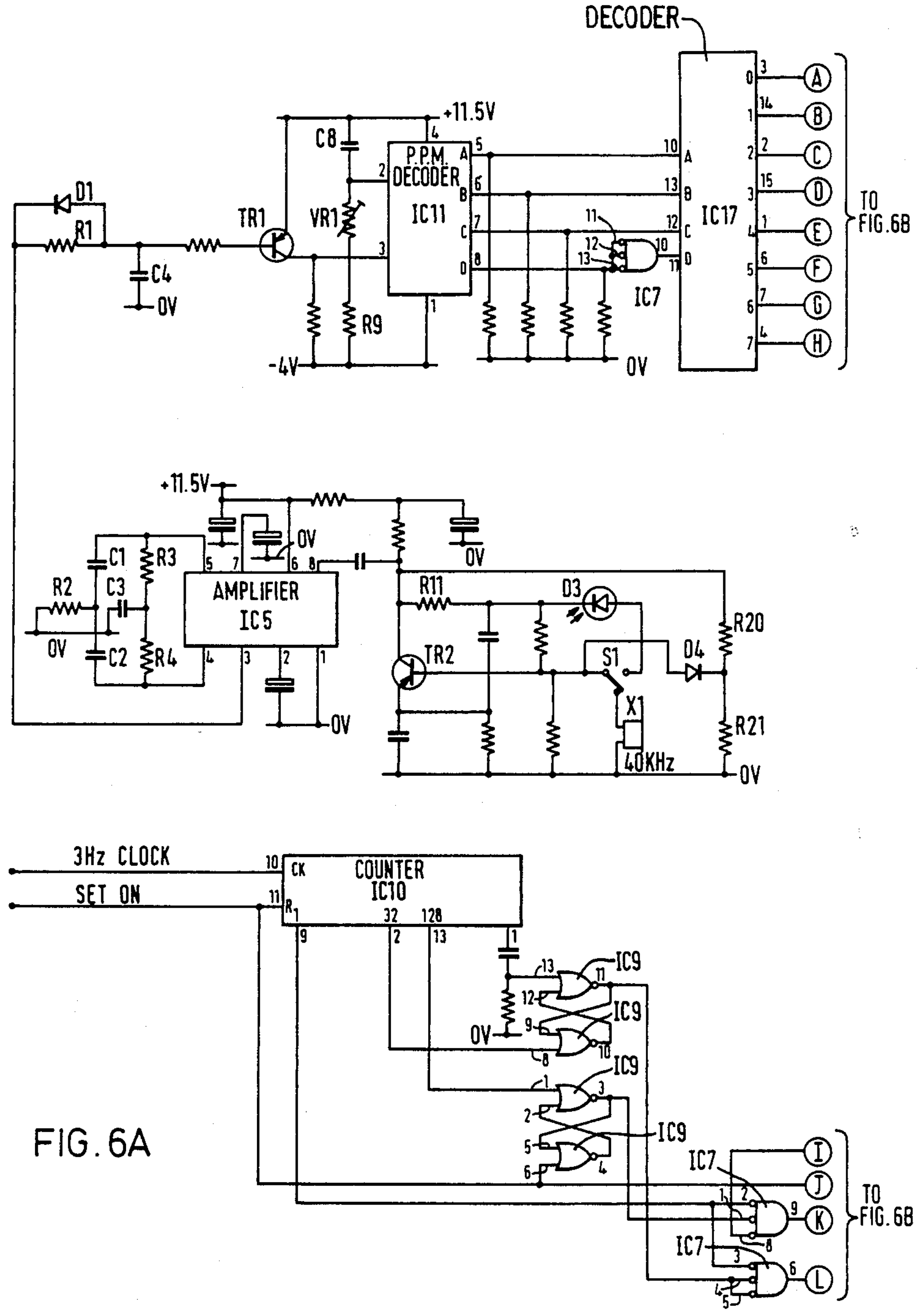
Figure 6B:
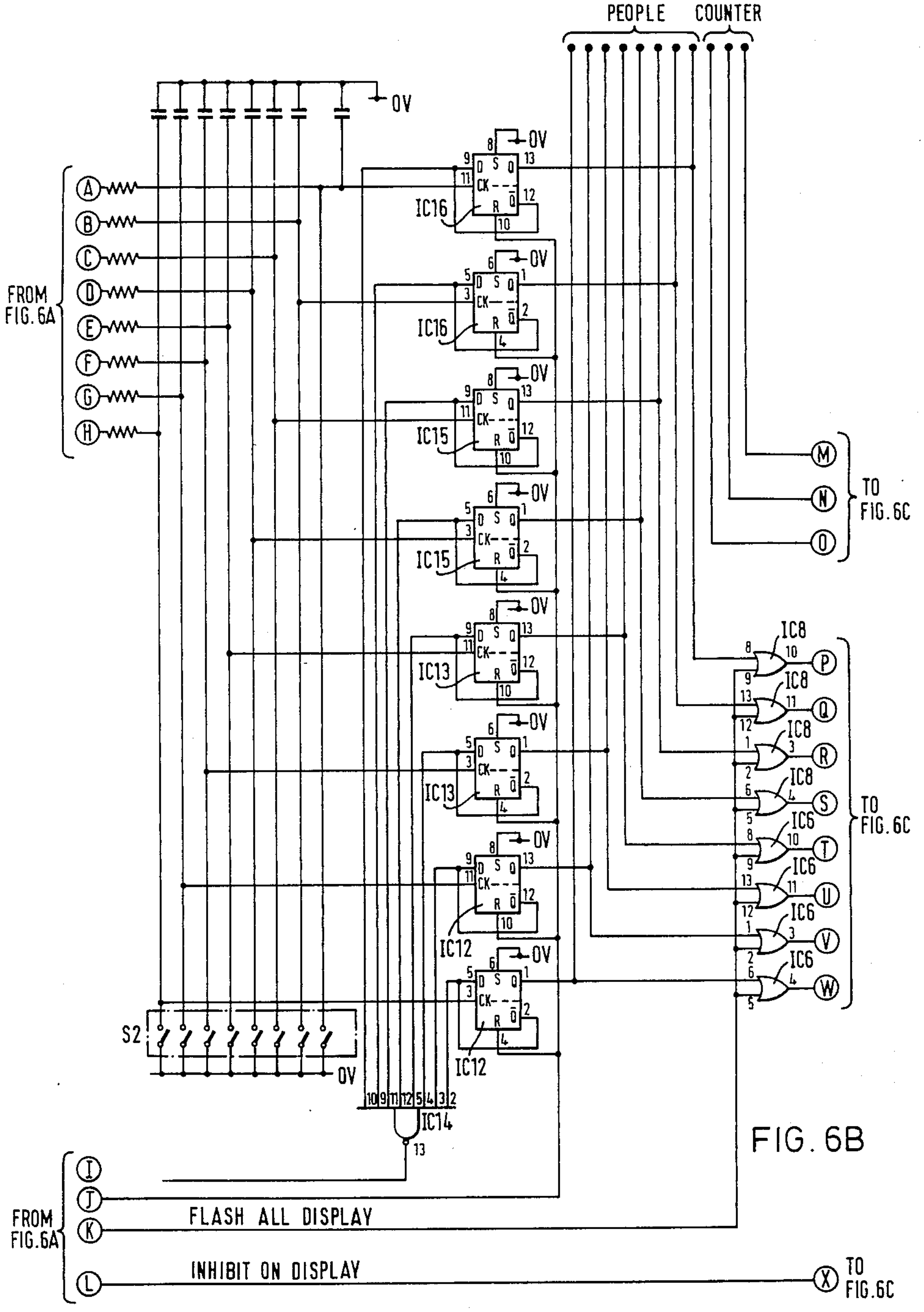
Figure 6C:
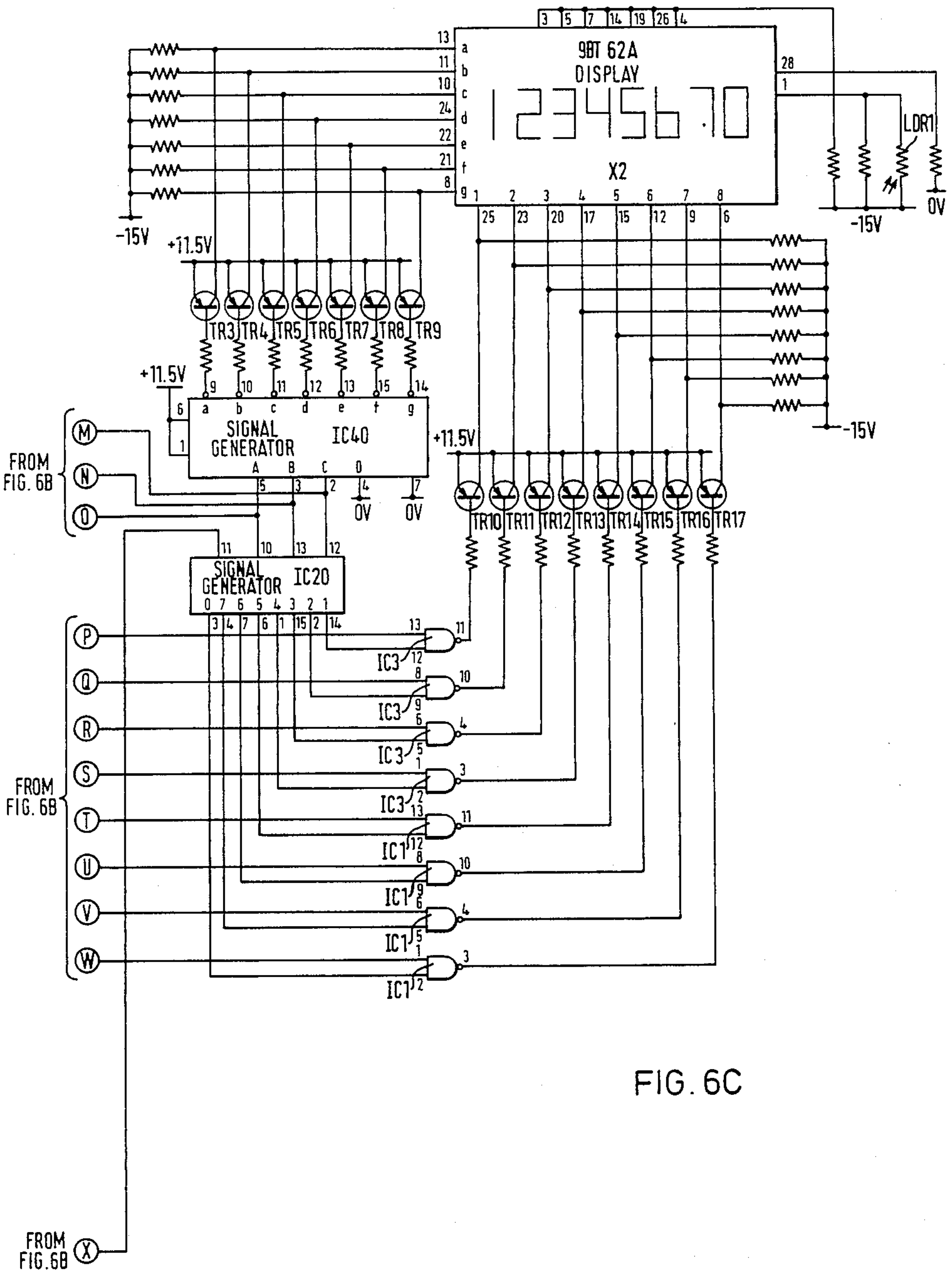
Figure 7:
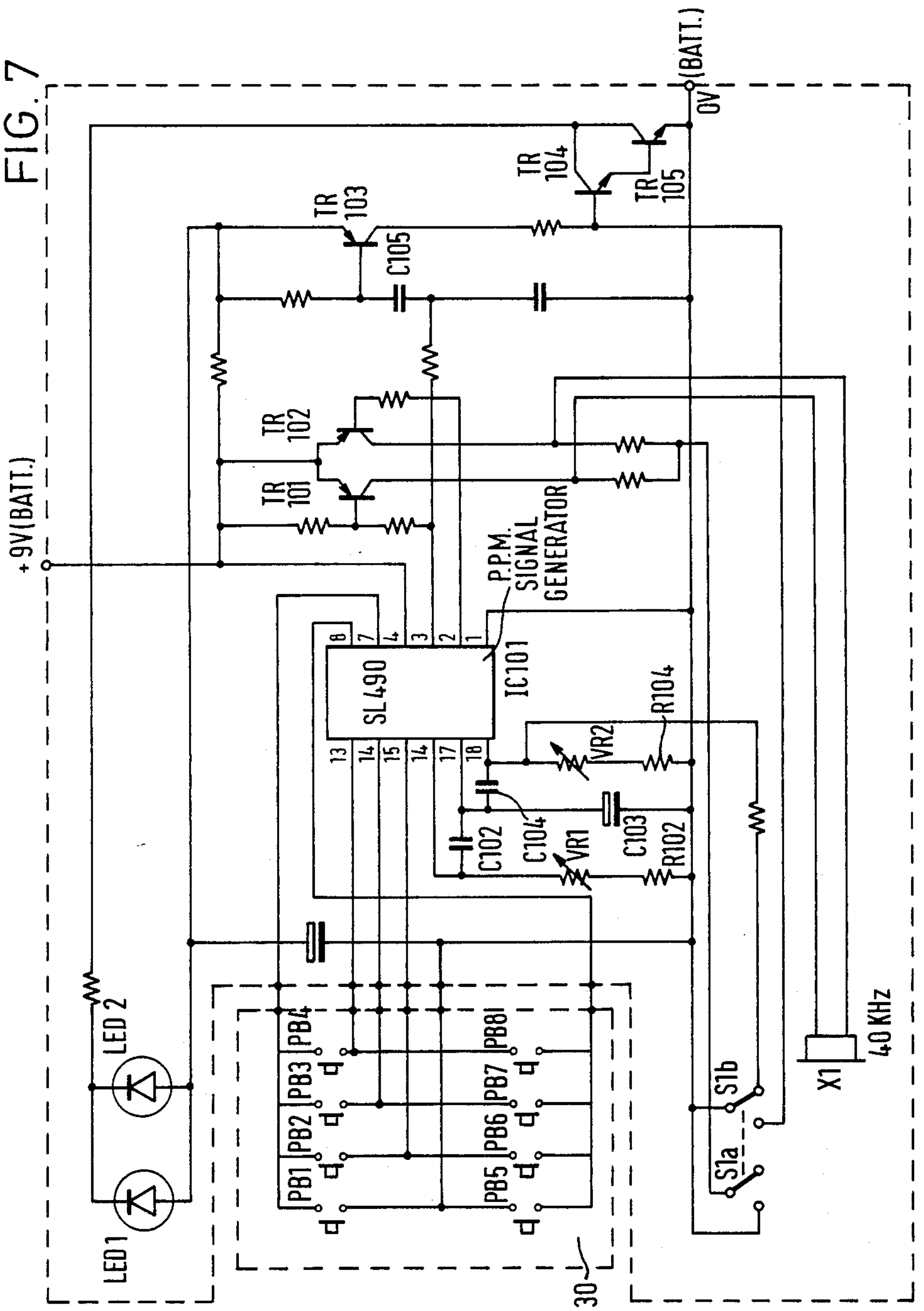
Figure 8:
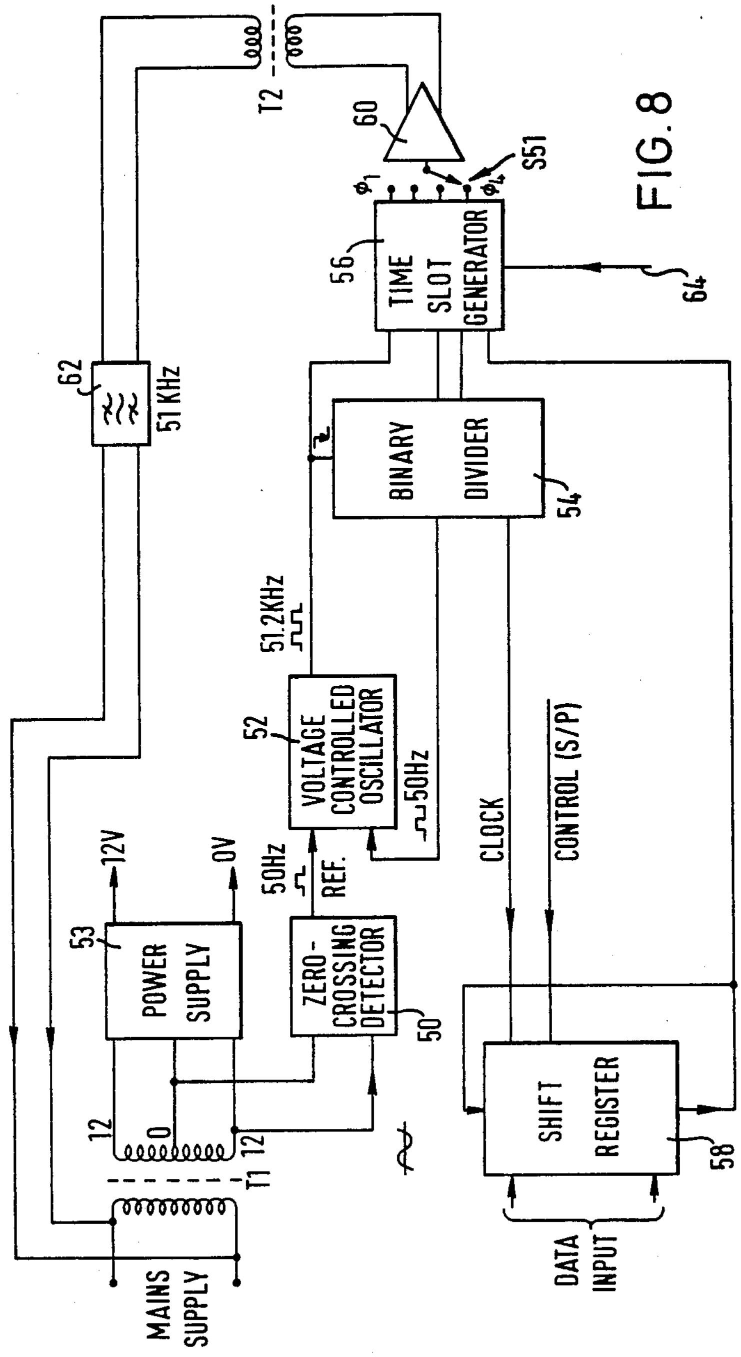
Figure 9:
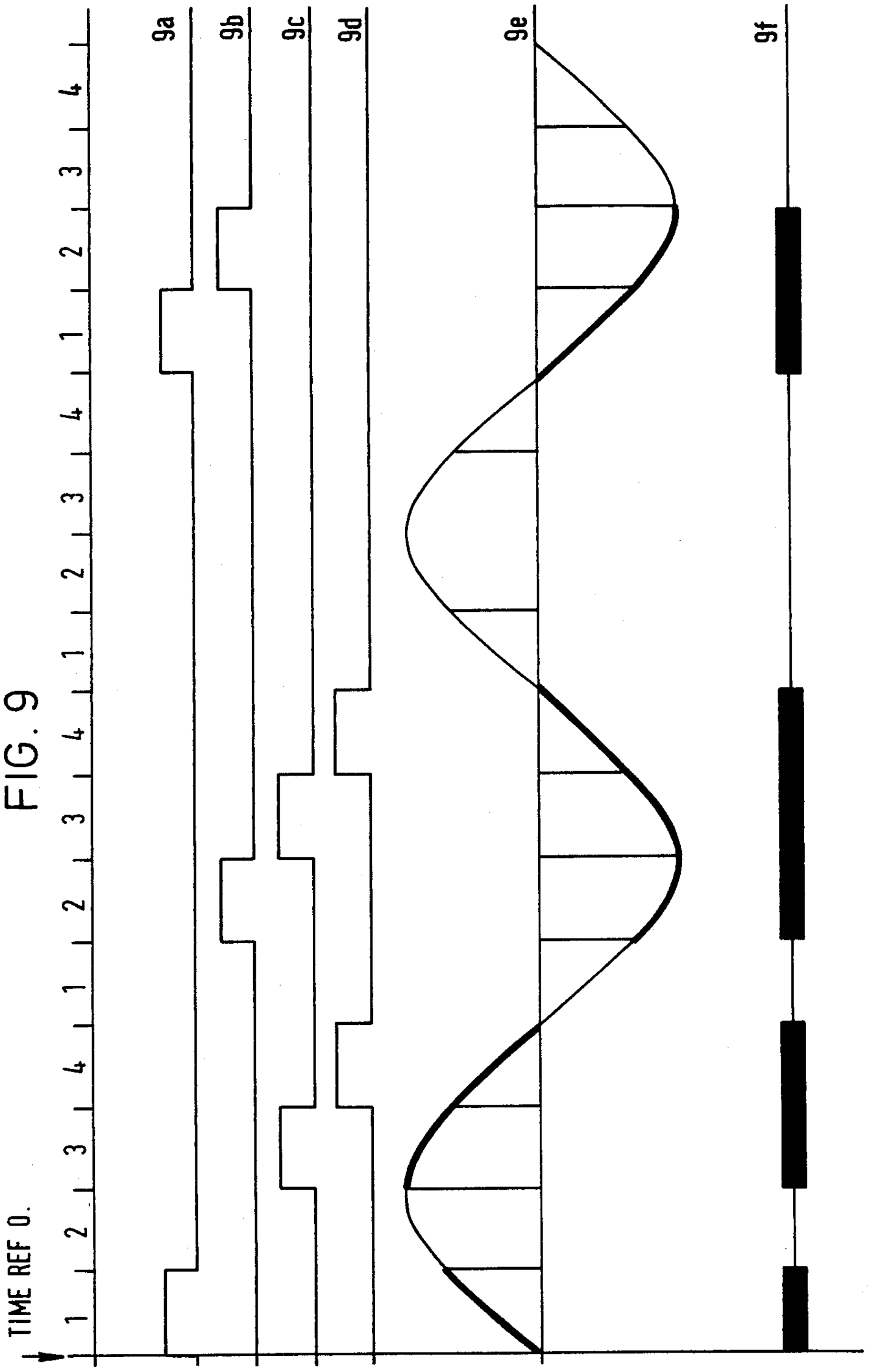
Figure 10:
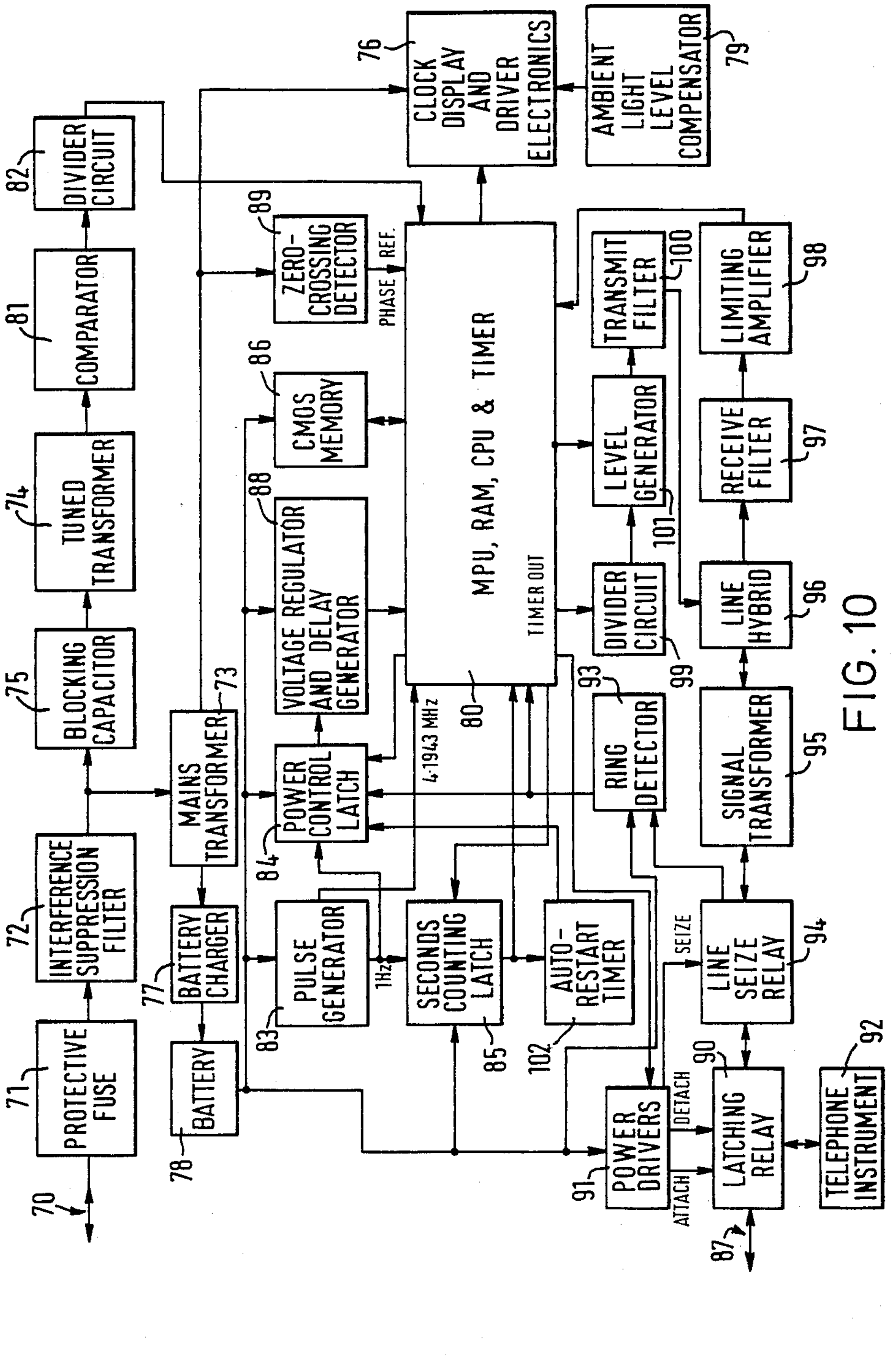
Figure 13:
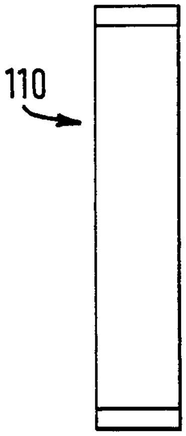
Figure 11:
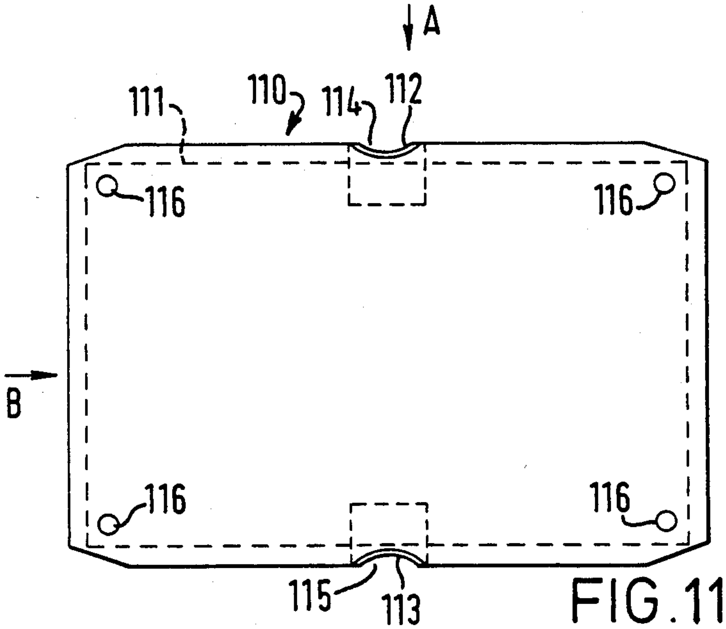
Figure 12:
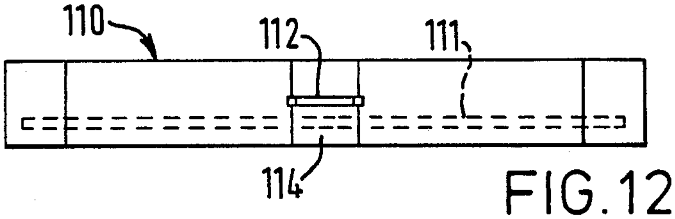
Figure 14:
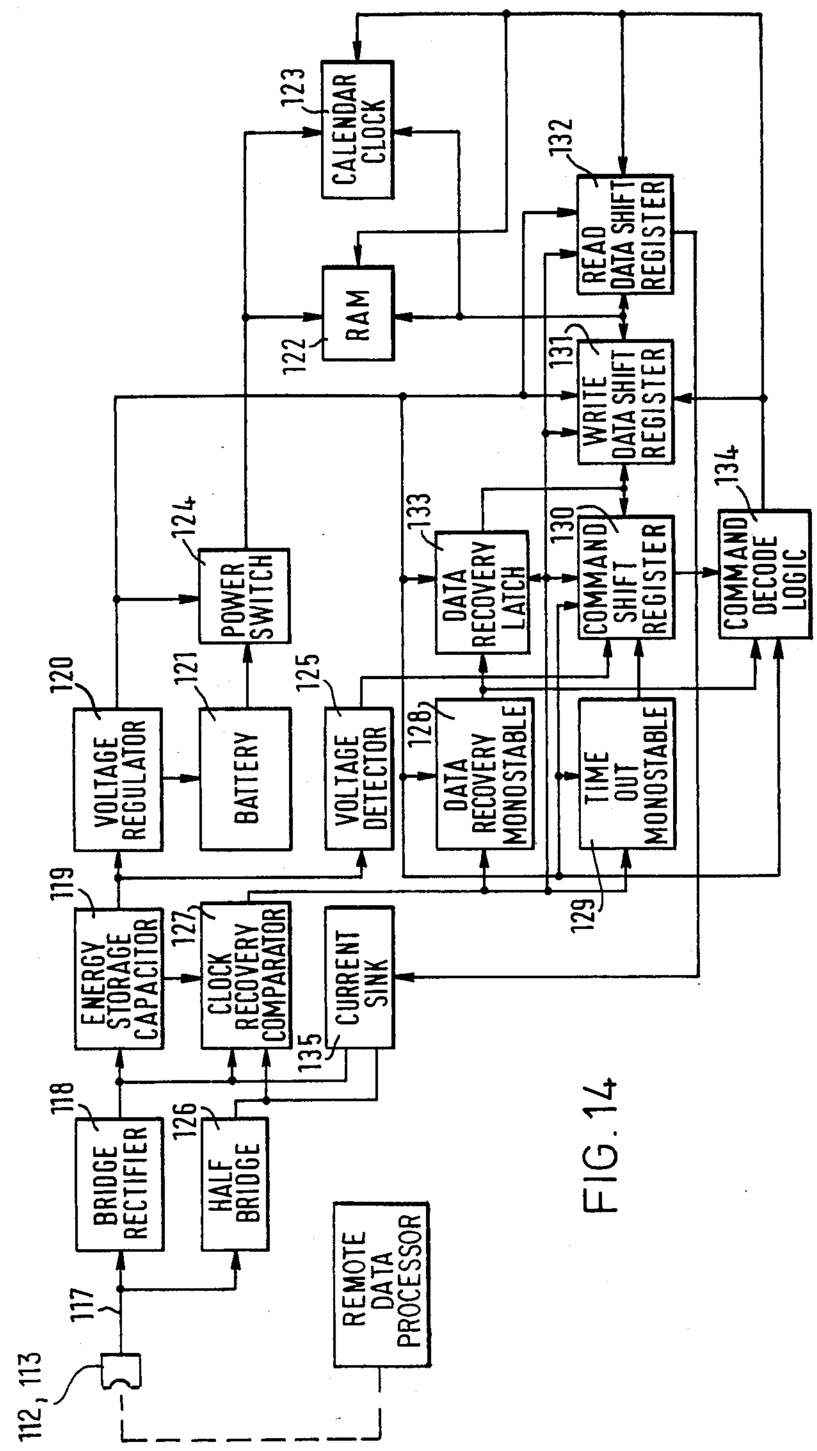

FIGS. 4*a* and 4*b* show a practical embodiment of another part of the detection unit shown in FIG. 2;

FIG. 5 is a block diagram of a people monitoring unit;

FIGS. 6A, 6B and 6C, when joined as indicated, show a practical embodiment of the people monitoring unit of FIG. 5;

FIG. 7 shows an embodiment of a remote handset for use in the people monitoring unit of FIG. 5;

FIG. 8 is a block diagram of an embodiment of a mains transmission unit;

FIG. 9 shows graphs 9*a* to 9*f* illustrating the operation of the mains transmission unit of FIG. 8;

FIG. 10 is a block diagram of a meter which records information from a mains supply line, and transmits the information at night by way of a public telephone network;

FIG. 11 is a major side view of a removable semiconductor data module, FIGS. 12 and 13 being views in the direction of arrows A and B in FIG. 11 respectively;

FIG. 14 is a block diagram of circuitry in the module; and

Figure 15:
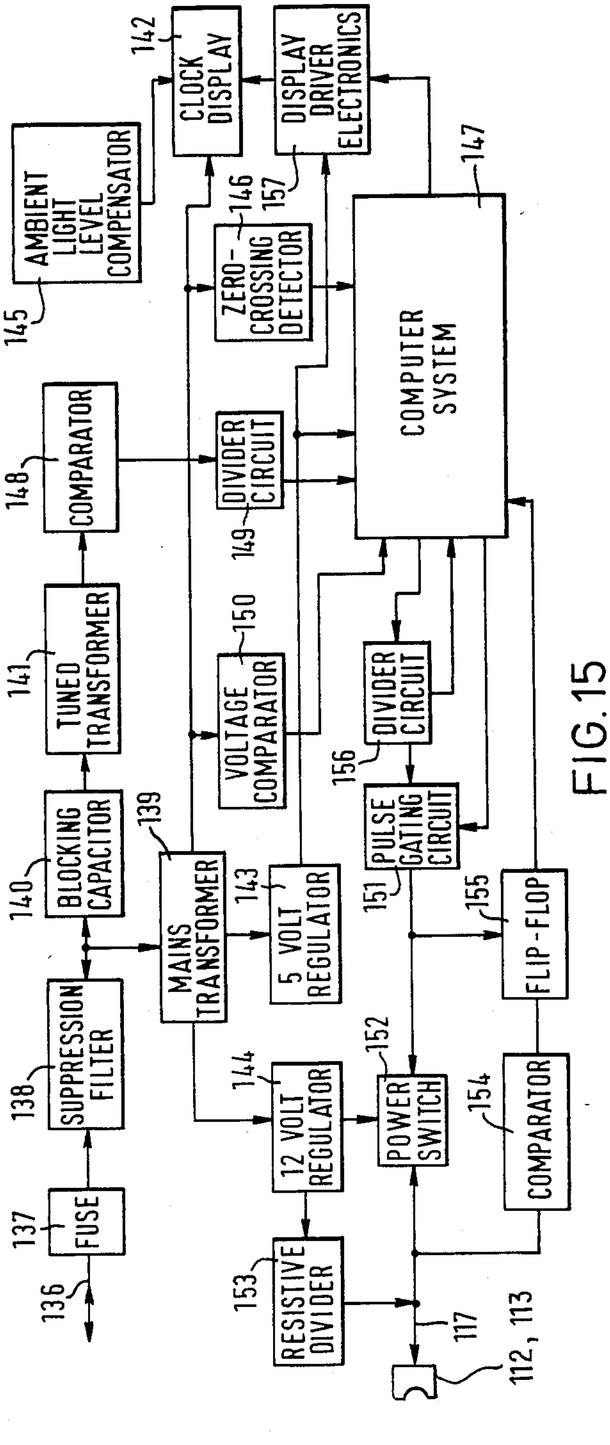

FIG. 15 is a block diagram of a meter for use with the module.

Figure 1:
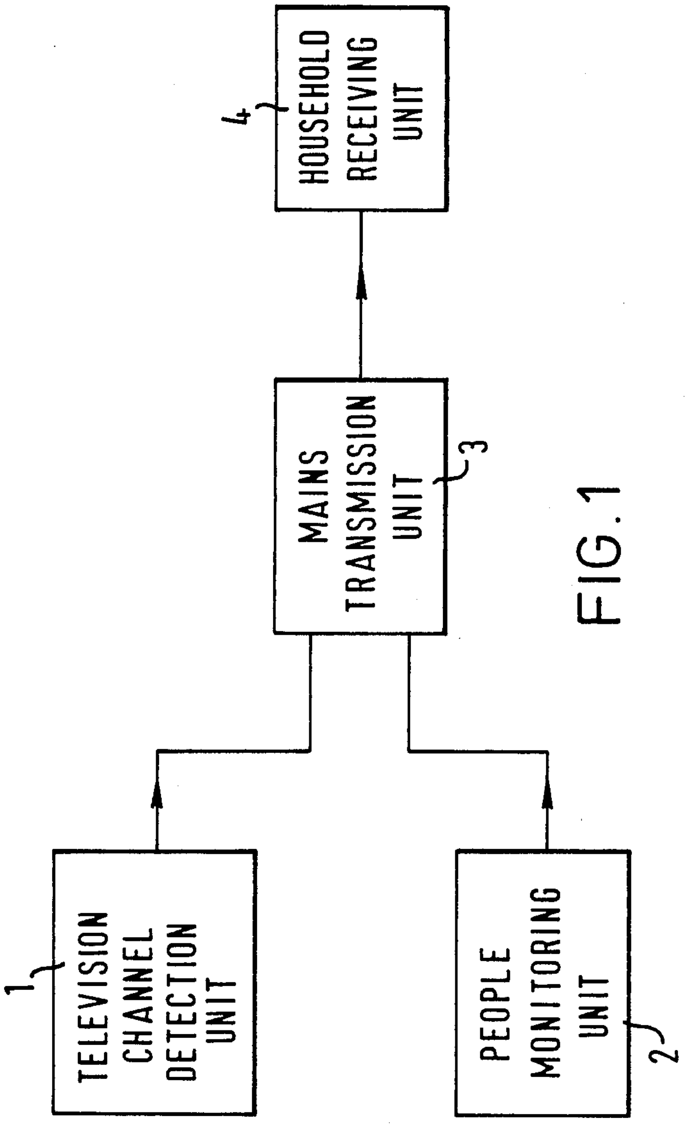
FIG. 1 is a block diagram of a television monitoring system.

FIG. 1 shows a block diagram of a television monitoring system comprising a television channel detection unit 1; a people monitoring unit 2; a mains transmission unit 3; and a household receiving unit 4.

The television channel detection unit 1 will now be described in detail with reference to FIGS. 2 to 4.

The unit 1 is designed to sense ultra or very high frequency radiation from a tuner 10 in a domestic television receiver I2 and so determine if the channel to which the television receiver is tuned is one of a multiplicity of channels which have been preset into the detection unit 1. A different binary coded word is produced for each channel detected. A pick-up probe 14 is in the vicinity of a local oscillator of the television receiver 12 to be monitored. The inductively coupled signal is fed into a modified variable capacitance diode tuned tuner 16. A standard television tuner could be used, provided that the frequency range is extended to cover the range of the local oscillator frequency radiated from the TV receiver. The signal from the tuned tuner is amplified using a conventional I.F. amplifier and surface acoustic wave (S.A.W.) filter 18, for example one made by Mullard or Plessey. A d.c. voltage is produced from a detector 20 when the tuner 16 is tuned to the radiated frequency of the TV receiver 12. The unit 1 is programmed to look for preset frequencies by applying different tuning voltages to variable capacitance diodes within the tuner 16. The output of the detector 20 is connected to a low frequency oscillator 21 and an analogue tuning voltage is generated from a binary number using digital to analogue conversion. Binary numbers are stored in a non-volatile store memory chip 24 and each number is addressed in sequence from an address counter 25. The output of the memory 24 is connected to a digital to pulse width converter 22. The output mark to space ratio of the converter is therefore a function of the addressed binary number. the resulting repetitive pulse train is averaged in an integrating amplifier 26 to produce a d.c. tuning voltage which is proportional to the stored binary number. The tuner 16 can therefore be tuned by varying the binary number in the memory 24.

To set up the detection unit to receive different frequencies, an external plug-in unit is used. This external unit enables a particular store address to be selected and the memory 24 contents to be incremented or decremented to tune to the required frequency. The procedure is repeated for all the required frequencies.

In operation, the memory 24 is addressed in sequence from the address counter 25 until a voltage is detected. The address counter 25 is then halted and the tuner 16 is locked to the detected frequency. The binary store address number is used to identify the detected television channel number.

To preserve the memory 24 contents when power to the detection unit is switched off, either a battery powered random access memory (RAM) or an electrically alterable read only memory (EAROM) can be used. The address numbers that represent the detected television channels are outputted to the mains transmission unit 3.

Figure 3:
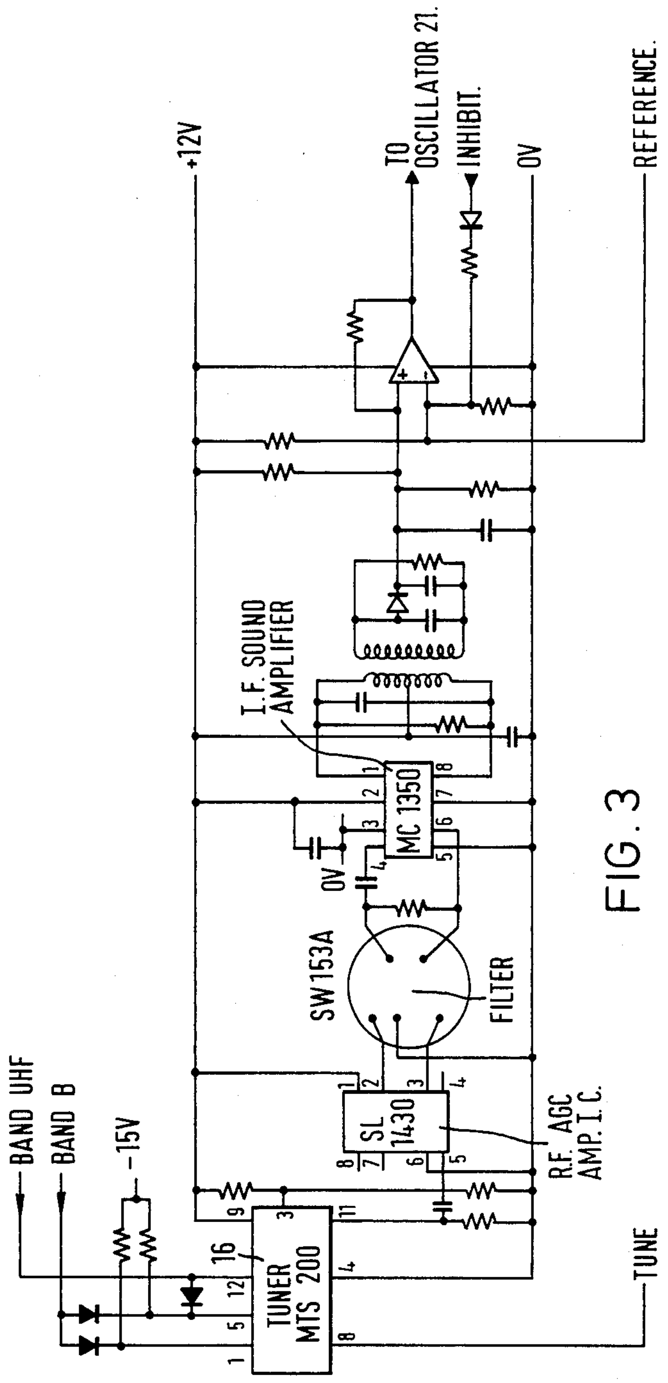
FIG. 3 shows a practical embodiment of part of the detection unit shown in FIG. 2.

FIG. 3 shows a practical implementation of the tuner 16 (by way of example one made by Thomson CSF of type MTS 200) and the amplifier and S.A.W. filter 18 (by way of example one of type SW153A) and detector 20, and a practical implementation of another part of the detection unit 1 is shown in FIGS. 4*a* and 4*b*. The function of the address counter 25 and digital to pulse width converter 22 is achieved in one integrated circuit IC2 of type AV-3-8211 made by General Instruments. The memory 24 is an electrically alterable read only memory (EAROM) type ER1400 IC1 and the integrating amplifier is designed around integrated circuit IC3. The integrated circuit IC2 also provides band switching information for tuner 16 to have multiband operation, tuner 16 normally being in a condition for Band A operation unless +12 volts is applied to either of the lines marked Band UHF and Band B for it to be set to the corresponding one of these conditions.

Advantages of the above-described unit 1 are that only known required frequencies are looked for; and there is no direct electrically conductive connection between the unit and the television set.

FIGS. 5 to 7 illustrate an embodiment of the people monitoring unit 2. In order to monitor the viewing habits of people within a particular room, a push-button system is employed. Each person, who will at some time view the television set, is allocated a number. In the unit to be described the number of users is limited to eight.

As shown in FIG. 5, buttons 30 are housed in a self contained battery powered handset 32 placed in a convenient position within the room. When a person starts to view the television receiver, the button 30 assigned to that person is momentarily pressed. An infra-red 34, or ultrasonic 36, transmitter emits signals which are received by an infra-red 34*a*, or ultrasonic 36*a*, detector in a remote receiver unit 33. A data link is thereby established between the handset 32 and the remote receiver unit 33 and a code unique to the number of the depressed button is received, decoded in decoder 38 and stored in one of eight bistables; e.g. eight D flip-flops 40. The output of that bistable is displayed as an identical number on a vacuum fluorescent display 42. When the viewer ceases to view, the same button is momentarily depressed and the appropriate bistable 40 in the receiver unit 33 is reset via the data link 34, 34*a* or 36, 36*a* and the displayed number is cleared. The outputs of the eight bistables 40, which represent the people status, are connected to the mains transmission unit 3 and are sent as part of a 16 bit word to the household receiving unit 4.

The facility of choosing between an infra-red or an ultrasonic data transfer between the handset 32 and the receiver unit 33 has been incorporated so that the option exists to select a mode which does not interfere with any existing remote control system which may already be in use by the viewer.

Other features are also included in the receiver unit to remind viewers to update or check the input data and to reduce eroneous operation. These features include the features that (a) all the eight display digits will flash if the television receiver is on and no people viewing data is entered;

(b) a reminder is activated every 10 minutes and the displayed digits are flashed for about 10 seconds;

(c) all people inputs are inhibited if the television receiver is switched off; and (d) switches 44 are provided within the unit so that any of the eight people inputs can be masked out.

The receiver unit 33 can be integral with the mains transmission unit 3 or can be as an add-on unit connected via a multi-way cable.

FIG. 6 shows a practical embodiment of a people detection unit and display board in the infra-red mode, as selected by switch S1, the coded signal being detected by the sensor D3 and amplified by transistor TR2 which also sets the d.c. bias. Resistors R20, R21 and diode D4 prevent overload under conditions of high input signal. The signal is a.c. coupled from the collector of TR2 via C9 to the integrated amplifier IC5. The amplified signal on pin 3 of IC5 is stretched, by the network D1, R1 and C4, and DC shifted by transistor TR1, so as to be compatible with the pulse position modulation decoder IC11. VR1, R9 and C8 set the internal time reference for the decoder IC11. The binary coded signals which are present on A, B, C, D (IC11), when any of the push buttons on the handset are depressed, are decoded by IC17 into eight individual signals. These signals can be masked by the switches S2a–S2h.

The eight bistables IC12–IC16 are used to store the people status. The integrated circuits IC20 and IC40 generate multiplexed signals for the vacuum fluorescent display, the high voltage drives being provided by transistors TR3 to TR17.

The counter IC10 and IC9 (connected as two bistables) provides timing logic and divide a 3 Hz clock to generate a flashing reminder for 32/3 seconds after a delay of 682 seconds. Also a continuous flashing of the display occurs after 128/3 second if the television receiver is on and no people are set into any of the eight bistables as detected by the 8-input AND gate IC14.

A light dependent resistor LDR1 sets the intensity of the display to allow for varying ambient light conditions.

When the ultrasonic mode is selected by S1, the signal is amplified as before except that the network C1, C2, C3, R2, R3, R4 forms a twin-tee filter network tuned to the resonant frequency of the ultrasonic transducer X1.

In FIG. 6, integrated circuits IC1 and IC3 are of type CD4011B; IC2 and IC17 are of type CD 4028B; IC4 is of type CD4543B; IC5 is of type TDA 4050B; IC6 and IC8 one of type CD4071B; IC7 is of type CD4025B; IC9 is of type CD4001B; IC10 is of type CD4040B; IC11 is of type ML926; IC12, IC13, IC15 and IC16 are of type CD4013B; and IC14 is of type CD4068B.

The design of the remote handset shown in FIG. 7 is centred around the integrated circuit IC101, type SL490, which produces a different pulse position modulated signal when any of the push buttons, PB1–PB8, are depressed. Resistors VR1, R102 and capacitor C102 set the pulse train clock frequency.

In the infra-red mode, selected by S1a and b, the coded pulse train is a.c. coupled via a capacitor C105 to transistors TR103, TR104 and TR105, forming a cascaded amplifier. The power transistor TR105 provides high current pulses to drive the infra-red emitting diodes LED1 and LED2.

In the ultrasonic mode IC101 also produces a 40 KHz pulsed carrier, inhibited in the infra-red mode by switch S1b and set by VR2, R104 and C104. This carrier is amplified in a push-pull amplifier formed by TR101 and TR102 to drive the transducer X1. The drive to the base of TR104 is short-circuited by switch S1b.

One embodiment of the transmission unit 3 will now be described with reference to FIGS. 8 and 9.

This unit 3 is designed to accept data from the people monitoring unit 2 and from the television channel detection unit 1 and to transmit the data via an existing domestic house wiring system to a household receiving unit 4.

As shown in FIG. 8, a sine-wave output on the secondary of a mains transformer T1 which is connected to a power supply 53 is connected to the input of a zero-crossing detector 50 and a voltage transition is generated each time the input waveform passes through zero. This transition is used as a reference to phase-lock a voltage controlled oscillator 52 at a predetermined carrier frequency, e.g. 51.2 kHz. This frequency is divided by binary dividers in a 14 stage binary divider 54 and the output, 50 Hz, is used as an error signal for the phase-locked oscillator 52. Thus, all the outputs from the binary dividers 54 are phase-locked to the mains supply at 50 Hz. Outputs of the binary dividers at 200 Hz and 100 Hz are decoded in a time slot generator 56 to gate the carrier frequency, in this case 51.2 kHz, into a particular time slot selected by switch S51. In this particular application the data is sent as a 16 bit word, preceded by 16 bits (i.e. 16 mains half cycles) when no carrier is sent. This enables the household receiving unit 4 to detect the start of the 16 bit data word, the first bit of which is always present. The data from the people monitoring unit 2 and television channel detection unit 1 is parallel-loaded into a shift register 58 during the 16 blank half cycles and is sent out in serial form at a rate of, for example, one bit per 10 mS. The output from the time slot generator 56 is a 2.5 mS long burst of 51.2 kHz carrier which is gated on or off depending on the data stored in the shift register 58. The data word is repeated as long as the system is switched on.

The gated carrier is amplified in power amplifier 60 and isolated from the mains supply by a tuned transformer T2. A band pass filter 62 is included to remove any harmonics which could cause radio interference.

In this particular application, the mains transmission signal is inhibited when the television receiver is switched off, by way of input 64 to the time slot generator 56.

The carrier frequency (in this example 51.2 kHz) need not be a multiple of 50 Hz, and need not necessarily be phase-locked to the mains supply frequency. This system has been described with reference to one of four transmitters which all use the same carrier frequency; however, different frequencies could be used for each transmitter but this would complicate the receiver input filter design.

Each transmitter sends data in a unique time slot, referenced to the zero crossing point in the mains supply waveform. Thus only one transmitter is on at any given time, and as each transmitter is time-locked to the mains supply waveform, the household receiving unit 4 knows when to sample the mains supply to detect data from a particular transmitter 3.

The signal can be sent through the mains wiring by using any two conductors from the three that may be available, i.e. (1) line and neutral, (2) line and earth, (3) neutral and earth.

A different frequency could be sent by a transmitter when not sending a digital '1', which would mean that one of two frequencies was always present at the receiver. This would result in a reduced error count when interfering signals were present, and would enable a system of automatic level control to be used at the receiver to compensate for signal level variations due to load condition changes on the mains supply. However, such an arrangement would be more complex and therefore more expensive than that hereinabove described.

FIGS. 9*a–d* show typical data received from each of four transmitters; FIG. 9*e* shows the 50 Hz mains signal with a superimposed 51.2 kHz signal; and FIG. 9*f* shows the 51.2 kHz signal at the output of a receiver input filter.

Advantages of the unit 3 are that television sets can be moved from point to point by simply plugging into any mains socket without any modification of the system; only a two wire system is used; radio frequency interferenced is reduced to a minimum; all transmissions are synchronized to the mains supply; and where there is a plurality of such units 3 in different households, a single frequency is used for all units, and all units are asynchronous.

It is possible to have a meter which records information from a mains supply line, in a similar manner to that which has been described, and then transmits the information to a central computer by way of a public switched telephone network. In view of the fact that the load on the public telephone network is likely to be reduced at night, such transmission usually occurs at night. Such a meter will now be described with reference to FIG. 10.

The meter is of a double insulated construction and is connected to a mains supply by way of a two core mains cable 70. The mains supply is first passed through a protective fuse 71 and an interference suppression filter 72, before feeding the primary of a mains transformer 73 and the primary of a 51 kHz tuned transformer 74 through a 50 Hz blocking capacitor 75. The mains transformer 73 provides the power required by a vacuum fluorescent clock display and driver electronics 76. It also provides power to a battery charger 77 which maintains a battery 78 in a fully charged condition when the mains supply is present. Display electronics, in the form of an ambient light level compensator 79, varies the brilliance of the display 76 in response to changes of the ambient light level. The zero-crossings of the mains transformer 73 secondary voltage are sensed in a zero-crossing detector 89 and fed to a computer system 80 to provide a reference signal related to the mains supply zero-crossings.

The signal which passes through the 51 kHz tuned transformer 74 is fed to a comparator with hysteresis 81 the output of which clocks a divider circuit 82. Should a 51 kHz signal be present on the mains wiring at a level in excess of about 60 mV peak to peak, the divider output toggles at 51 kHz; otherwise, the divider output is static, apart from occasional state changes caused by noise on the mains supply. The computer system 80 counts the number of state changes of the divider 82 output during certain intervals of time defined by their relation to the mains zero-crossings. Should the number of state changes in such an interval exceed a preset threshold, the 51 kHz signal is deemed to be present on the mains wiring during that interval.

The battery 78 is float-charged from the mains, and powers all the electronic circuits apart from the display and driver electronics 76. It is protected against accidental short-circuiting by a fuse. The meter can maintain recorded information, keep track of the passage of time, attach and detach itself from the telephone line at the appointed times and answer calls from the central computer when so attached without mains power. The computer system 80 is normally switched off, when the mains supply is absent, to conserve the battery charge. A crystal controlled pulse generator 83; a power control latch 84; a seconds counting latch 85; and a CMOS memory 86 are, however, powered at all times.

The pulse generator 83 sets both latches 84, 85 at one second intervals and supplies a reference frequency to clock the computer system 80. The power control latch 84 is also set when ring current is detected on the telephone line 87. When the power control latch 84 is set, a voltage regulator and delay generator 88 is enabled and the computer system 80 is powered from its regulated output. The delay generator ensures that the computer system 80 is not released until the circuits have had time to stabilise after they have been switched on. The computer system 80 resets the power control latch 84 when the computer system 80 requires to turn itself off. The seconds counting latch 85 is reset by the computer system 80 whenever it is found to be set and the internal computer time is advanced by one second. Should the computer program fail due to some transient electrical disturbance, the seconds counting latch 85 will no longer be reset regularly. This condition is detected by an auto-restart time 102 and the computer system is powered off and restarted in the normal manner, thus saving the battery from damage due to deep discharge and allowing the meter to resume its normal operation. The CMOS memory 86 retains stored information when power is removed from the computer system.

A latching relay 90 in the meter is operated by a pair of power drivers 91 feeding separate coils in the relay 90. These power drivers 9I are driven directly by the computer system 80. If the detach driver is momentarily activated, the telephone instrument 92 is connected to the telephone line 87 by the latching relay 90 and the telephone system operates in the normal manner. If the attach driver is momentarily activated the telephone instrument is disconnected from the line 87, its input is short-circuited and a meter ring detector 93 is connected across the line. When ring current is present on the telephone line 87 in this condition, the computer system 80 is powered up, if it is not already powered, and a signal from the ring detector 93 informs the computer system 80 that ring current is present. Ring current does not pass through the telephone instrument 92 and its bell does not ring.

The computer system 80 validates the presence of ring current for 800ms and then turns on a power driver 81 to operate a line seize relay 94. This relay 94 disconnects the ring detector 93 from the telephone line 87 and connects a line holding inductor and an a.c. coupled signal transformer 95 to the line. Carrier signals present on the telephone line are coupled through the signal transformer 95 to an active line hybrid 96 which amplifies the received signal and separates it from the transmitted signal. The amplified signal is passed through a receive filter 97 which removes out-of band interference and is then squared up by a limiting amplifier 98. The computer system 80 then directly demodulates the resultant signal.

The modulated signal which is transmitted to the telephone line is generated by the computer system 80 as a sequence of timer output pulses corresponding to the zero-crossings of the outgoing signal. These timer output pulses toggle a divider circuit 99 and the resultant output is fed to a transmit filter 100 through a variable level generator 101. The computer system controls the output of the level generator 101 to compensate for the variation in gain of the transmit filter 100 between a 2100 Hz echo suppression tone and the transmit carrier frequency. The transmit filter 100 suppresses the harmonics in the level generator 101 output. The filter output 100 is fed through a 600 ohm matching resistor in the active line hybrid 96 to the signal transformer 95 which couples it to the telephone line 87.

In a system for monitoring the viewing habits of a plurality of households, each of the households would be installed with such a meter. The system is such that an existing telephone line of each household is used by the system without significantly diminishing the housheld's enjoyment of its telephone service. This is achieved by several means, the chief of which is by operating only in a period in the early part of the morning. The telephone instrument of each household operates normally outside of half-hour intervals in this part of the morning, in which the meter is connected to the telephone line. In addition, once a meter has been successfully interrogated it detaches itself from the telephone line for the rest of the night. For those households who are accorded some degree of priority this will typically mean that they lose the full use of their telephone for only a few minutes each night.

Should someone attempt to call a household whilst its meter is connected to the telephone line, the meter will answer the call with a continuous tone to indicate that the telephone call has been answered by a machine. When the call is terminated, or after about 25 seconds, the meter will detach itself from the telephone line until the next half-hour time slot. If a second attempt is made to call the household, within half an hour of the first call, the call will be routed to the telephone instrument in the normal manner.

Should a member of a household wish to make an outgoing call whilst the meter is connected to the telephone line, he must unplug the meter's telephone cord from the wall socket. A variant of the meter system allows for the automatic handover to the telephone instrument when the handset is raised to make an outgoing call.

Another important feature of the system is that the telephone calls are originated by the central computer system. In addition,the origination of calls centrally from the central computer rather than the meters allows the system to progress calls as quickly as possible. More meters can be interrogated per central telephone line and the time that each meter spends on the telephone line is minimised.

There is a "holiday" button on the rear of each meter. In essence this button is used to indicate to the data collection system that a potential viewer is away on holiday. This is accomplished by the viewer pressing the "holiday" button before departing on holiday. A display of AM 0:00 indicates that the button has ben sensed by the meter. In this condition the meter will report to the central computer that "holiday" status is true. When the viewer returns from holiday, in response to his tuning on the television set, the meter displays time in the normal manner and will report to the central computer that "holiday" status is false.

The system is designed to collect audience data from the remote meters. It comprises a central master computer (with a standby), associated communications equipment and optionally one or more slave computers connected to the master computer via private lines. Meters in households are interrogated (polled) over the public switched telephone network from the central computer and the slave computers.

The central computer is connected to several 300 baud modem/dialler pairs for meter polling, several 1200 baud modem/dialler pairs for communication with slaves, a disc drive for data and program storage, a tape drive for data backup and data interchange with an IBM system, a printer and a visual display unit console. The slave computers are connected to several 300 baud modem/dialler pairs for meter polling and a 1200 baud modem for communication with the central computer. Polling is initiated by command to the central computer. Additional commands may be issued to obtain reports from the system and to produce data tapes. A directory containing information on the meters to be polled is passed before each run from an IBM computer to the central computer. After overnight data collection, data tapes are produced on command, as well as an updated directory tape. These tapes are returned to the IBM computer for processing. Polling occurs overnight, the central computer allocating work to and receiving data from the slave computers. The slave computers are dialled at the beginning of data collection and remain in contact with the central comptuer until data collection has ceased. The time available for polling is divided into eight half-hour time slots as mentioned above. Meters are divided into two classes, designated even and odd. Even meters are connected to the telephone line during even time slots. Odd meters are similarly connected during odd time slots. Once a meter has been successfully polled, it will not reconnect itself to the telephone line during the remainder of the night. All data interchange over telephone lines is error checked. When errors are detected, recovery procedures ensure that any detected corrupt information results in attempts to correctly retransmit that information. This applies to transmissions between the central computer and the slaves and between the meter and the central or slave computer. Data collection by the central computer is stored immediately on disc and tape. Data collected by a slave from a meter is retained in the memory of the slave until that meter is disconnected from the telephone line. The data is then transmitted to the central computer where it is stored on disc and tape.

Instead of having a storage system which is interrogated by way of a telephone line, it is possible to store the data received from the transmission means in a removable semiconductor data module.

Such a system then comprises a base station computer system complete with module reader or data processor 200 (FIG. 14), a number of meters and a larger number of removable data modules which circulate between the base station computer and the meters. The data modules carry time information from the base station to the meters and return time stamped viewing statements.

The module reader 200 (FIG. 14) is an intelligent subsystem which interfaces the data modules to the base station computer system by means of a serial communications link. The module reader provides the means for the base station computer system to read the contents of the data module and to correct the time in the data modules. At the same time, checks are made on the operation of the data module and a visual indication is provided to the operator of the operational status of the module.

The data module consists of a printed circuit board containing a random access memory, a calendar clock, a backup battery and a means by which data may be written to and read from the random access memory and the calendar clock through two electrical contacts. The whole circuit board is encapsulated in a polyurethane foam plastics housing with two electrical contacts protruding from recesses on opposite sides of the module housing.

Referring to FIGS. 11, 12 and 13, the shape of the data module 110 is roughly that of a rectangular parallelepiped with sides of about 14 mm, 70 mm and 108 mm respectively. Reference numeral 111 denotes the printed circuit board. Slots are provided in the rear panels of the meters and in the front panel of the module reader, through which a module can be inserted. These slots are only able to accept the smallest faces of the module although they may do so in four different orientations. The electrical contacts 112, 113 to the module are placed in the centre of the middle sized faces of the module. This mechanical arrangement, together with the polarity insensitive nature of the module interface, allows the module to function equivalently with the module inserted into a meter or a module reader in all of its four possible orientations. The module housing departs from that of a rectangular parallelepiped in the following ways. First, the corners and edges are rounded to minimise damage during transport. Secondly, the largest faces of the module are tapered to facilitate the insertion of the module into the module receptacle of either a meter or a module reader. Finally, in the centres of the middle sized faces there are rounded channels 114, 115 running perpendicular to the largest faces of the module,the contacts 112, 113 protruding from the surfaces of these channels. Reference numerals 116 denote location pads.

The module receptacle within a meter or a module reader makes electrical contact with a module by means of two spring loaded contacts. These contacts bear on the rounded channels in the sides of the module and serve to pull the module into the receptacle in the final few millimetres of its insertion. This provides a positive feeling that a module has been fully inserted. This inward force also serves to retain the module in the receptacle should a meter be moved with a module in place.

Referring to FIG. 14, a data module communicates with a meter over a two wire interface 117. The meter generates a pulse width modulated 32 kHz pulse train. The leading edge of each pulse serves to clock data in the module and to latch received data from the module. In the quiescent state,the meter generates a 25% duty cycle pulse train on the interface 117.

This pulse train is rectified by a bridge rectifier 118 in the module and fed to an energy storage capacitor 119. The energy storage capacitor powers a voltage regulator 120 which feeds power to the logic circuits in the module. A battery 121 provides power to a random access memory 122 and a calendar clock 123, to maintain recorded data and time information when the module is removed from the meter.

The battery 121 is trickle charged from the voltage regulator 120 when the module is inserted into a meter with mains power applied. A power switch 124 directs power from the voltage regulator 120 to the random access memory 122 and the calendar clock 123 when the logic circuits are powered.

When the module is not installed in a meter or a module reader, the energy storage capacitor 119 is discharged and the logic circuits are not powered. When the module is installed in a meter, or when mains power is applied to a meter, the energy storage capacitor 119 begins to charge and power is fed to the logic circuits in the module. A voltage detector with hysteresis 125 holds the logic circuits in a quiescent state until the voltage on the energy storage capacitor 119 has risen to a level at which the correct operation of all the circuits within the module can be guaranteed.

A second upper half bridge 126 feeds the pulses on the interface 117 to a clock recovery comparator 127 which separates the input pulses from the steady voltage level on the interface 117. The clock recovery comparator 127 triggers a data recovery monostable 128 and a timeout monostable 129. It also clocks a command shift register 130, a write data shift register 131 and a read data shift register 132.

The data recovery monostable 128 has an output pulse width of approximately one half of the input pulse period. At the trailing edge of the data recovery monostable 128 pulse , a data recovery latch 133 samples the output of the clock recovery comparator 127.

The meter and the module reader send commands and data to the removable module by pulse-width modulating the input pulse train. Each period of 30.5 $\mu$s will be referred to as a bit cell with the start of each bit cell considered to be the leading edge of the input pulse train. The quiescent state of a 25% duty cycle pulse, i.e.

a pulse with a nominal length of 7.6 μs, will be referred to as a zero bit. A 75% duty cycle pulse, i.e. a pulse with a nominal length of 22.9 μs will be referred to as a one bit. In addition, an interruption to the pulse train, i.e. a bit cell in which no pulse is present, will be referred to as a missing clock pulse. A write command to the data module consists of a start (one) bit, a zero bit, 14 bits of write address, 8 bits of write data and a missing clock pulse. The pulse-width modulated data stream is recovered by the data recovery latch 133. The output of the data recovery latch 133 is shifted into the command shift register 130 and the write data shift register 131 on the leading edge of each input pulse. When the start bit reaches the 24th stage of the command shift register 130, command decode logic 134 enables the data output of the write data shift register 131 and clocks the write data into the read data shift register 132 and into either a location in the random access memory 122 or a register in the calendar clock 123 depending upon the write address. At the same time,the first 8 stages of the command shift register 130 are reset.

The output of the read data shift register 132 controls a current sink 135 which loads the interface 117 when the input pulse is absent. The meters and the module readers feed the interface 117 with a voltage lower than that of the input pulse when the input pulse is absent. This voltage is fed from a high impedance source and the loading caused by the module current sink is detected by a voltage comparator.

The timeout monostable 129 has an output pulse of approximately one and a half times the input pulse period. In the quiescent state, 25% duty cycle input and during the 24 bits of the command transfer this monostable is retriggered sufficiently frequently that it never times out. However, it does time out after the 24 bits of command have been transferred because of the missing clock pulse and in so doing resets the command shift register 130. If a one should be shifted into the 25th stage of the command shift register 130, stages 9 to 24 of the shift register are reset to guard against false command decoding.

If during a write command a clock pulse is removed, for instance because of some intermittent electrical contact occasioned by the removal of the module from a meter whilst the record is being updated, the write operation is aborted and no data is inadvertently corrupted in the module. Similarly, protection is provided against pulse removal during a read command.

Following a write command with its associated missing clock pulse, successive input pulses shift data through the read data shift register 132. This data modulates the current sink 135, and so returns to the meter or module reader a record of what was written to the module.

A read command to the data module consists of a start (one) bit followed by a one bit, 14 bits of read address, a missing clock pulse and 8 zero bits to shift out the read data. When the start bit reaches the 24th stage of the command shift register 130, the command decode memory logic 134 enables data from either a location in the memory 122 or from a register in the calender clock 123 depending upon the read address. This data is loaded into the read data shift register 132 and the first 8 stages of the command shift register are reset.

The missing clock pulse of the read command causes the timeout monostable 129 to reset the command shift register 130. Successive input pulses shift data through the read data shift register 132 which modulates the current sink 135 and so transmits data back across the interface 117. A zero at the output of the read data shift register 132 causes the current sink 135 to turn on and so increases the loading on the interface 117. A one at the output of the read data shift register 132 causes the current sink 135 to turn off and the loading on the interface 117 is removed. The current sink 135 is turned off during input pulses to reduce power dissipation.

The serial input to the read data shift register 132 is strapped to zero so that in the quiescent state, 25% duty cycle at the interface 117, the current sink 135 is turned on after each input pulse. This loading of the interface 117 in the quiescent condition is used to detect the presence of the module in a meter or a module reader.

Each meter is of double insulated construction and, referring to FIG. 15, is connected to a mains supply by way of a two core mains cable 136. The mains supply is first passed through a protective fuse 137 and an interference suppression filter 138, before feeding the primary of a mains transformer 139 and through a blocking capacitor 140 the primary of a 51 kHz tuned transformer 141. The mains transformer 139 provides the power required by a vacuum fluorescent clock display 142. It also provides power to a 5 volt regulator 143 and a 12 volt regulator 144.

Display electronics, in the form of an ambient light level compensator 145, varies the brilliance of the display 142 in response to changes of the ambient light level. The zero-crossings of the mains transformer 139 secondary voltage are sensed by a zero-crossing detector 146 and fed to a computer system 147 to provide a reference signal related to the mains supply zero-crossings.

The signal which passes through the 51 kHz turned transformer 141 is fed to a comparator with hysteresis 148, the output of which clocks a divider circuit 149. Should a 51 kHz signal be present on the mains wiring at a level in excess of about 60 mV peak to peak, the divider 149 output toggles at 51 kHz. Otherwise, the divider output is static apart from occasional state changes caused by noise on the mains supply. The computer system 147 counts the number of state changes of the divider output during certain intervals of time defined by their relation to the mains zero-crossings. Should the number of state changes in such an interval exceed a preset threshold, the 51 kHz signal is deemed to be present on the mains wiring during that interval.

When mains power is applied to the meter, a voltage comparator 150 holds the computer system 147 in a reset condition until the output of the 5 volt regulator 143 can be guaranteed. The computer system 147 generates pulses of variable duty cycle by means of a pulse gating circuit 151. The pulse gating circuit 151 turns on a power switch 152 which applies 12 volt pulses from the 12 volt regulator 144 to the module interface 117. A resistive divider 153 feeds 6 volts to the interface 117 at high impedance.

When the power switch 152 is turned off, a comparator 154 detects the loading of the interface 117 caused by the module's current sink circuit 135. The output from the comparator 154 is latched by flip-flop 155 on the leading edge of the 12 volt power pulse.

The pulse gating circuit 151 is clocked by a divider circuit 156 running from the computer system's clock. The computer system 147 synchronises itself to the divider circuit 156 output and controls the pulse gating circuit 151. The pulse gating circuit 151 generates a 32 kHz pulse-width modulated pulse train which is fed to the data module when it is inserted into the receptacle in the rear of the meter. The computer system 147 can generate a pulse duty cycle of 25% or 75% by means of the pulse gating circuit 151. In addition it can suppress the pulse output altogether to generate missing clock pulses.

The computer system 147 detects the presence or absence of a data module by detecting the module's loading of the interface 117 when a 25% duty cycle pulse train is applied to the interface 117. If the module is absent, the computer system 147 displays OFF on the vacuum fluorescent clock display 142 by means of display driver electronics 157. If a module is present, the computer system 147 validates the information fields within the module, reads the time from the module and displays the time on the vacuum fluorescent clock display 142. It then proceeds to record time-stamped channel and people statements in the module as they are received from the mains supply.

We claim:

1. A storage module for storing television usage monitoring data to be transferred as a plurality of data words between a receiver and a data processor, comprising:

means for releasably electrically coupling the storage module to the receiver and to the data processor;

means for measuring time and having an updating input for receiving an updating signal from the data processor for updating the time measuring means;

means comprising a semiconductor store for storing the data words;

means coupling the storage means to the releasable coupling means for transferring the data words from the receiver to the storage means and from the storage means to the data processor; and means coupling the coupling means to the time measuring means for transferring the updating signal from the data processor wherein the means for measuring the passage of time includes means whereby each of a plurality of the data words transferred from the storage means to the data processor comprises an indication of the time at which data carried by each data word was received by the receiver.

2. A storage module as claimed in claim 1 wherein the time measuring means comprises means for outputting the time to the receiver and whereby the data words formatted in the receiver carry an indication of the time at which data carried by the data words was received by the receiver.

3. An apparatus for transferring data obtained from a television viewing monitoring system to a data processor, said apparatus comprising:

a transmitter having means for accepting data relating to the number of people watching a television set and the channel to which the television set is tuned and means for transmitting said data;

a semiconductor storage module for storing said data and comprising an updatable clock, semiconductor storage means and electrical coupling means connected to said clock and storage means for the passage of data between the coupling means and the clock and between the coupling means and the storage means; and a receiver having means for receiving said data and means for removably electrically coupling said receiving means to said coupling means of said storage module for the transfer of said received data to said storage module, whereby said storage module is able to be removed and its stored data read by and its clock updated by an external data processor, the storage module further comprising means for outputting to the external data processor time information derived from the updatable clock and relating to the time at which said data was received by the receiver.

4. The apparatus as claimed in claim 3, wherein the transmitting means comprises means for transmitting the first and second data by way of a domestic mains wiring system.

5. The apparatus as clained in claim 4, wherein the accepting means comprises means for formatting the first and second data as a multi-bit digital word, and in which the first transmitting means comprises: in means for defining a plurality of time slots each half cycle of a voltage supply of the mains wiring system, which voltage supply fluctuates about a baseline at mains supply frequency, the time slots being referenced to baseline crossings of the voltage supply;

means for generating a carrier signal for the monitoring system;

means for gating the carrier signal "on" and "off" according to the bit values of the digital word, means for selecting one of the plurality of time slots for the transmission of the carrier signal when gated "on", whereby with a plurality of such monitoring systems, the time slots are selectable to correspond uniquely to the respective monitoring systems; and means for transmitting the carrier signal, when gated "on", onto the mains wiring system in the time slot corresponding uniquely to the monitoring unit from which the first and second data is accepted.

6. An apparatus for transferring data obtained from a television viewing monitoring system to a data processor as claimed in claim 3 wherein:

the semi-conductor storage module comprises means for receiving signals from the data processor for updating the clock when the storage module is coupled to the data processor; and the transmitter comprises means for transmitting the data by way of a domestic mains wiring system.

7. An apparatus for handling data obtained from a television viewing monitoring system for use with a television selectively tunable to any of a plurality of channels, the apparatus comprising:

means for monitoring people and producing first data relating to the number of people watching the television set;

means for detecting the channel to which the television set is tuned and producing second data representative thereof;

means for accepting the first and second data;

first means coupled to the accepting means for transmitting the first and second data to a receiver; and a semiconductor storage module for storing the first and second data received by the receiver, the storage module comprising:

means for releasably electrically coupling the receiver to the semiconductor storage module for the transfer of the first and second data thereto from the receiver;

semiconductor storage means for storing the first and second data received by the receiver;

means for measuring time having an updating input for receiving an updating signal from an external data processor for updating the time measuring means; and means for outputting to the data processor time information relating to the time at which first and second data was received by the data receiver.

8. The apparatus as claimed in claim 7, wherein the transmitting means comprises means for transmitting the first and second data as a multi-bit digital word by way of a domestic mains wiring system.

9. The arrangement as clained in claim 7 wherein the transmitting means comprises means for transmitting the data by way of a domestic mains wiring system.

* * * * *